Dec. 17, 1963   J. O. HELVERN   3,114,438
AUTOMATIC BRAKE ADJUSTER

Filed Jan. 14, 1963                                2 Sheets-Sheet 1

INVENTOR.
James O. Helvern
BY D. D. McGraw
His Attorney

Dec. 17, 1963  J. O. HELVERN  3,114,438
AUTOMATIC BRAKE ADJUSTER
Filed Jan. 14, 1963  2 Sheets-Sheet 2
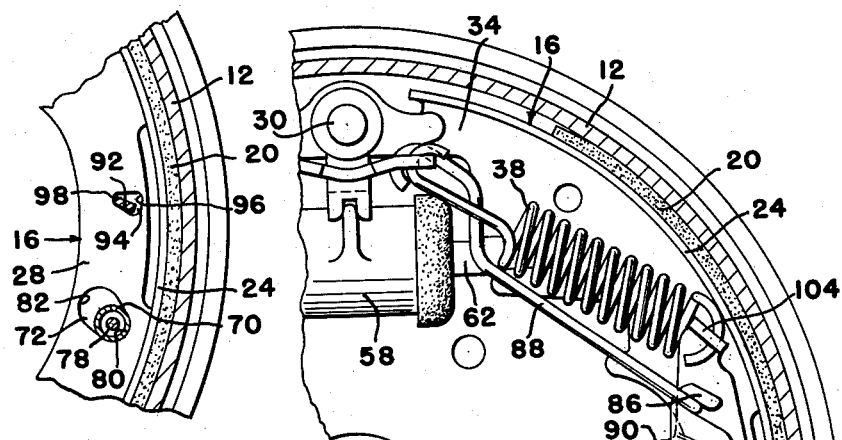
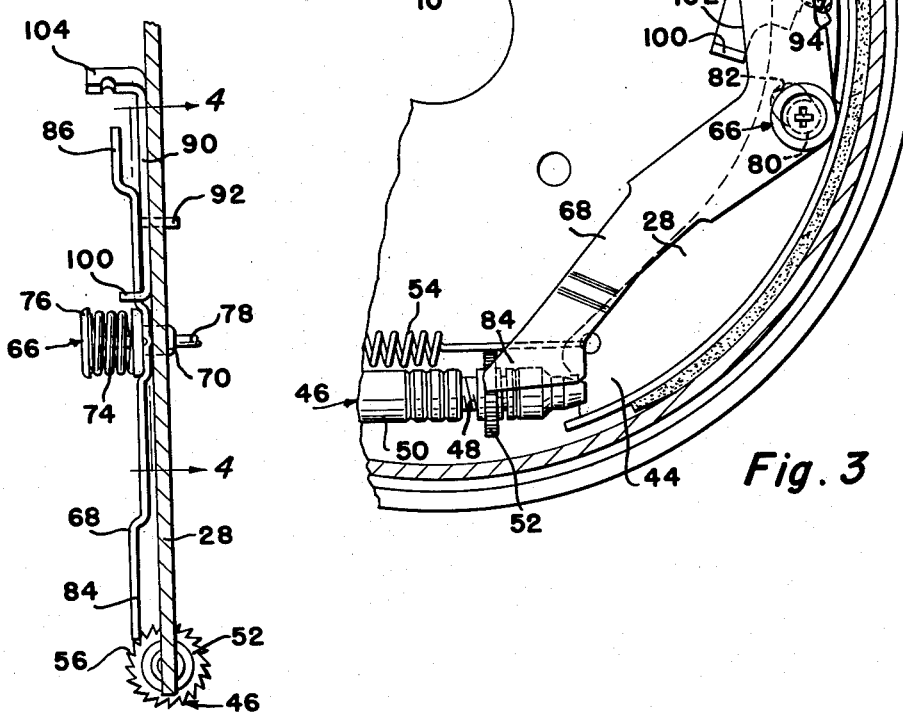
INVENTOR.
James O. Helvern
BY
His Attorney

United States Patent Office 3,114,438
Patented Dec. 17, 1963

3,114,438
AUTOMATIC BRAKE ADJUSTER
James O. Helvern, Lewisburg, Ohio, assignor to General Motors Corporation, Detroit, Mich., a corporation of Delaware
Filed Jan. 14, 1963, Ser. No. 251,192
5 Claims. (Cl. 188—79.5)

The invention relates to an automatic adjuster for drum type brakes to maintain the brake shoes in a predetermined clearance condition relative to the brake drum to compensate for wear of the linings on the brake shoes. In a brake utilizing an adjusting strut which adjusts the clearance between the brake shoe and the drum, there are times during brake application that the thrust load on the adjusting strut is so high that the strut cannot be extended by the adjusting device so that any automatic adjusting mechanism that is connected with the adjusting strut is prevented from normal operation. Under this condition excessively high loads are carried in the automatic adjusting mechanism which tend to break or bend parts of the mechanism, thus creating a malfunctioning mechanism during future attempted automatic brake adjustments. Mechanism embodying the invention provides an automatic brake adjusting unit which includes structure for relieving excessively high loads from the automatic adjusting mechanism which they tend to occur. The mechanism includes a lost motion connection between the adjusting lever of the automatic brake adjusting mechanism, which is mounted for pivotal movement and translatory movement in a slot on a shoe web, and a second link pivotally movable on the web. This is accomplished by providing a resilient link connection between the second link and a fixed point in the brake and a fixed length connection between the adjusting lever and a fixed point in the brake. By use of this construction when the adjusting lever of the automatic brake adjusting mechanism is prevented from normal movement by high thrust loads on the adjusting strut, the adjusting lever moves relative to the shoe on which it is pivotally and slidably mounted and the second link and resilient link mechanism accommodates this movement, thus absorbing the movement of the brake shoe and relieving the automatic adjusting mechanism of excessively high loads. The invention is an improvement over the automatic brake adjuster disclosed and claimed in Patent No. 3,050,157, entitled "Automatic Brake Adjuster" and issued to William V. Kenzik and Wilbur J. Oakley on August 21, 1962.

In the drawings:

FIGURE 3 is an enlarged view of a part of the brake illustrated in FIGURE 1 and illustrating the excessive load relief action of the automatic brake adjusting mechanism embodying the invention.

FIGURE 4 is a fragmentary view having parts broken away and in section and particularly illustrating a portion of the construction of one of the shoe webs, as taken in the direction of arrows 4—4 of FIGURE 5.

FIGURE 5 is a cross-section view having parts broken away and taken in the direction of arrows 5—5 of FIGURE 1.

Figure 1:
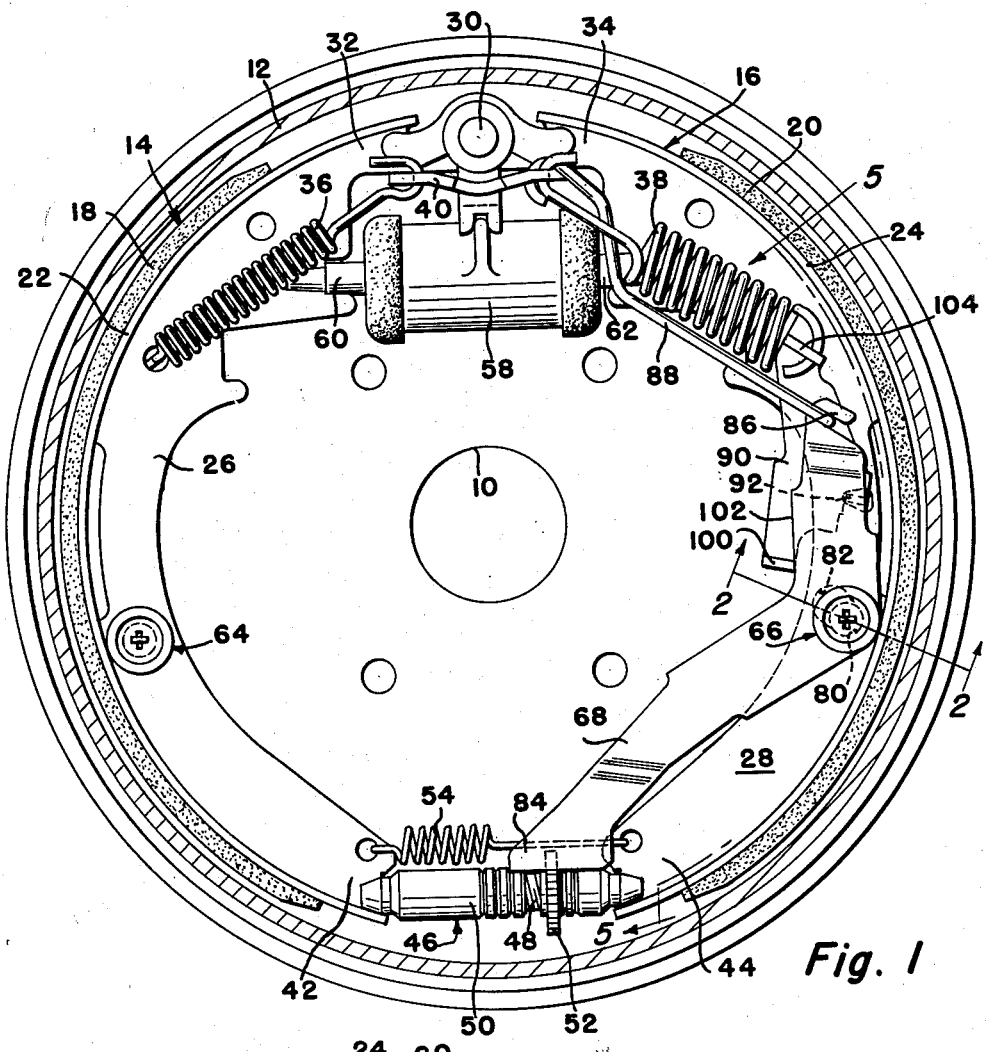
FIGURE 1 is a cross-section view of a brake mechanism incorporating features of the invention.

The brake in which the invention is incorporated includes a backing plate 10 which is a stationary member and is adapted to be secured to an axle housing or axle spindle of a motor vehicle. The brake drum 12 is adapted to be carried by a wheel of the vehicle. Primary brake shoe 14 and secondary brake shoe 16 are supported on the backing plate 10 and include linings 18 and 20, rim portions 22 and 24 to which the linings are respectively attached, and web portions 26 and 28 which support the rim portions. Web portions 26 and 28 are respectively secured to the rim portions 22 and 24 so that each brake shoe structure is in the form of a T-shaped element having a generally arcuate contour for placement within the brake drum 12. Shoes 14 and 16 are supported on suitable raised support pad portions on the backing plate 10 in the conventional manner and as illustrated form a part of a duo-servo brake mechanism.

Anchor pin 30 is secured to the backing plate 10 and is engaged by cooperating adjacent ends 32 and 34 of the brake shoes 14 and 16, respectively. Retraction springs 36 and 38 are secured at their adjacent ends to a bracket 40 positioned on the anchor pin 30 to hold the ends 32 and 34 of the brake shoes in engagement with the anchor pin 30. Spring 36 is secured at its other end to the shoe web 26 while spring 38 is connected to the automatic adjusting mechanism to be described so that it performs the retracting spring function as well as function as a part of the automatic adjusting mechanism.

The opposite adjacent ends 42 and 44 of the respective brake shoes 14 and 16 engage an adjusting strut 46 that has a threaded member 48 threadedly received by the cylinder member 50 so that rotation of the adjusting wheel 52 will effect extension of the adjusting strut 46. An extension spring 54 is secured at opposite ends to the end portions 42 and 44 of the respective brake shoes to retain the ends of the brake shoes in engagement with opposite ends of the adjusting strut 46. The adjusting wheel 53 has its periphery provided with a series of serrations 56 adapted for engagement by the adjusting mechanism hereinafter described or by means of a tool operated by a mechanic for manual adjustment of the brake shoes relative to the brake drum.

A hydraulic wheel cylinder 58 receiving hydraulic fluid under pressure from a master cylinder in the conventional manner is provided with plunger members 60 and 62 which respectively engage the webs 26 and 28 of the shoes to urge the brake shoes into engagement with the brake drum when pressurized hydraulic fluid is delivered from the master cylinder to the wheel cylinder 58.

Figure 2:
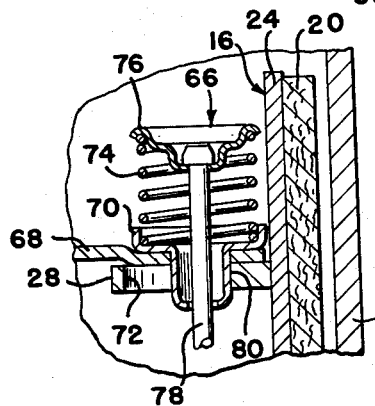
FIGURE 2 is a cross-section view taken in the direction of arrows 2—2 of FIGURE 1 illustrating the pivot connection to the brake shoe for the adjusting lever, and having parts broken away.

The brake shoes 14 and 16 are retained on the guide support pads of the backing plate 10 by means of hold-down spring assemblies 64 and 66. Assembly 64 holds shoe 14 in the conventional manner while assembly 66 is modified as a part of the adjusting mechanism embodying the invention. An adjusting lever 68 is mounted on the web 28 of shoe 16 by means of the hold-down spring assembly 66. As shown in FIGURE 2, the lever 68 has a bearing bushing 70 positioned in the slotted opening 72 of web 28, the bushing being retained in position by the hold-down spring 74 which cooperates with the spring retainer 76 and the pin mamber 78. The pin member extends into engagement with the backing plate 10 in the conventional manner. Slotted opening 72 has an arcuate end 80 extending toward the shoe rim 24 and a larger arcuate end 82 opposite end 80 so that the slots extend in a direction generally toward the anchor pin 30 in an opening manner. Bushing 70 extends through the slot 72 and has a shank outer radius substantially equal to the radius of the slot arcuate end 80. Bushing 70 is normally positioned in arcuate end 80 as seen in FIGURE 1. The adjusting lever 68 has one end portion 84 thereof arranged in the form of a detent which is engageable with the serrations 56 in the wheel 52 to effect rotation of the wheel when the lower end 84 of the lever rotates in a counterclockwise direction about the bushing 70. The upper end of lever 68 is provided with a hook 86 to which one end of a rigid wire link member 88 is attached. The opposite end of member 88 is hooked into an opening in the bracket 40, which is a part of the anchor arrangement of the brakes.

A second lever 90 is pivotally mounted by a tab 92 formed from a center portion thereof and extending into a slotted opening 94 also formed in web 28. Opening 94 is shaped in the same general manner as is opening 72 but has its larger end 96 extending generally toward the radial outer portion of the shoe 16 and its smaller end 98 extending generally radially inward. One edge of tab 92 normally engages slot end 98 and pivots in the slot with the pivoting action being permitted due to the fan shape of opening 94. Lever 90 is also provided with another tab 100 on its lower end which extends out of the plane of the lever so that it engages the edge 102 of adjusting lever 68 in camming relation. The upper end of lever 90 is provided with an ear 104 to which one end of retracting spring 38 is attached rather than being attached to the web 28 in the conventional manner. Spring 38 thus holds tab 92 against the slot end 98 and tab 100 against the edge 102 of lever 68.

The arrangement of the automatic adjusting mechanism is such that when lever 68 is prevented from pivotal movement about bushing 70 for any reason, and a brake application is made which causes brake shoe 16 to move clockwise away from the anchor pin 30, the bushing 70 will be forced to move toward the slot end 82 of slot 72 against the force exerted by lever 90 through tab 100 on lever 68, stretching the retraction spring 38 and thus preventing any breakage of the components of the adjuster or the brake.

In normal operation, when the brake is applied, with the vehicle in reverse, the shoe 16 moves away from the anchor pin 30 until it contacts the brake drum and is then pulled around in a clockwise direction. Since the bushing 70 normally moves with the shoe and since the upper end 86 of the lever 68 is held at a fixed distance from the anchor pin 30 by the link member 88, the lower end of the lever 68 is forced down so that the detent 84 engages a serration 56 of wheel 52 to turn the wheel and in turn unscrew the strut 46 and adjust the brake. Normally the load required to turn the wheel 52 is proportionately less than that exerted by lever 90 on lever 68 and the pivot bushing 70 remains in the end 80 of slotted opening 72.

There are times when a heavy brake action occurs when the brake assembly is rotated in the clockwise direction, as is normal on braking action during reverse movement of the vehicle. The heavy brake action on the braking structure will produce a high axial thrust on the adjusting strut 46 which is sufficient to prevent the threaded portion 48 from turning in the cylinder portion 50, thereby holding the wheel 52 stationary. This condition prevents the lever 68 from rotating in its normal manner so that if pivot bushing 70 were prevented from moving relative to web 28, excessively high stresses would be applied to the lever 68 which would either break the lever or overstress the parts to such an extent that they would subsequently malfunction. The relief action obtained by movement of bushing 70 in slotted opening 72, due to the lost motion type movement of second lever 90 in a clockwise direction on its tab 92 as permitted by further extension of spring 38, prevents this action.

The forces exerted by spring 38 on web 28 through tab 92 permit the spring to function as a retracting spring for the shoe 16 and to normally permit levers 68 and 90 to operate in a unitary manner.

I claim:

1. In a brake having a primary shoe and a secondary shoe and a stationary member, an automatic adjuster to maintain a predetermined brake shoe clearance in accordance with wear of the shoes, said adjuster comprising, an extendable strut between the shoes including a rotating wheel to extend the strut upon rotation of the wheel, a first lever, means rotatably and slidably mounting said lever on one of said shoes, said first lever having one end engageable with said wheel to rotate the wheel upon rotation of said lever, a second lever, means rotatably mounting said second lever on said one shoe adjacent the other end of said first lever, said second lever having force-transmitting means engaging said first lever, spring means connected for operative reaction on said stationary member and said second lever and resiliently holding said second lever force-transmitting means against said first lever, and a link between said stationary member and said first lever to effect rotation of said first lever upon movement of said one shoe to rotate said wheel and extend said strut.

2. In a brake having a primary shoe and a secondary shoe and a fixed member, an automatic adjuster to maintain a predetermined brake shoe clearance in accordance with shoe wear, said adjuster comprising, an extendable strut between the shoes having a rotatable wheel to extend the strut upon wheel rotation, a first lever, means slidably and rotatably mounting said first lever on one of said shoes, said first lever having one end engageable with said wheel to rotate the wheel upon rotation of said lever, a second lever, means rotatably mounting said second lever on said one shoe, spring means connected with said second lever and said fixed member resiliently holding said second lever in camming engagement with said first lever, a link between said fixed member and said first lever to effect rotation of said first lever and thereby effect rotation of said wheel to extend said strut upon movement of said one shoe, said second lever being rotatable on said one shoe against the action of said spring means when said first lever is held against rotation on said one shoe and caused to slide relative to said one shoe upon movement of said one shoe.

3. In a brake having a fixed member and a pair of shoes and an adjusting strut between said shoes, a brake self-adjusting assembly comprising, a brake adjusting lever, means rotatably and translatably mounting said adjusting lever on one of said shoes, said adjusting lever having one end engageable with said adjusting strut upon sufficient lever rotation on said one shoe to extend said adjusting strut for brake adjustment in accordance with shoe wear, resilient means comprising a second lever pivoted on said one shoe and spring means acting on said second lever and said fixed member to engage said second lever with said first lever and urge said first lever against translatory movement on said one shoe, and link means attached to the other end of said adjusting lever and to said fixed member to normally effect rotation of said adjusting lever on said one shoe upon shoe movement and to effect translatory movement of said adjusting lever on said one shoe against the action of said resilient means upon movement of said one shoe when said adjusting strut fully resists adjustment.

4. The brake self-adjusting assembly of claim 3, said spring means being a shoe retractor spring also acting through said second lever to retract said one shoe upon brake release.

5. The brake self-adjusting assembly of claim 3, the mounting means for said adjusting lever comprising an elongated slot formed in the web of said one shoe and a bushing extending through said lever in said slot and forming a part of a hold-down spring assembly, and the mounting means for said second lever comprising a generally fan-shaped slot formed in the web of said one shoe and a tab struck from said second lever engaging the smaller end of said slot for pivoting movement through the span of said slot.

References Cited in the file of this patent
UNITED STATES PATENTS
3,050,157    Kenzik et al. _____ Aug. 21, 1962
FOREIGN PATENTS
612,360    Great Britain _____ Nov. 11, 1948